United States Patent [19]

Britton

[11] Patent Number: 5,033,434

[45] Date of Patent: Jul. 23, 1991

[54] METHOD OF CONTROLLING AN INTERNAL COMBUSTION ENGINE

[75] Inventor: Russell G. Britton, Birmingham, United Kingdom

[73] Assignee: Rover Group Limited, United Kingdom

[21] Appl. No.: 489,681

[22] Filed: Mar. 7, 1990

[30] Foreign Application Priority Data

Mar. 8, 1989 [GB] United Kingdom ............... 8905277

[51] Int. Cl.⁵ .................. F02P 5/14; F02M 7/00; G01N 33/22

[52] U.S. Cl. .................. 123/425; 123/435; 73/35

[58] Field of Search ............... 123/425, 435; 73/35

[56] References Cited

U.S. PATENT DOCUMENTS

| 4,377,086 | 3/1983 | Linder et al. | 73/35 |
|---|---|---|---|
| 4,437,334 | 3/1984 | Laurenz | 73/35 |
| 4,444,043 | 4/1984 | Hattori et al. | 73/35 |
| 4,446,723 | 5/1984 | Böning et al. | 73/35 |
| 4,535,739 | 8/1985 | Kudo et al. | 123/425 |
| 4,549,514 | 10/1985 | Abe et al. | 123/425 |
| 4,919,099 | 4/1990 | Extance et al. | 73/35 |
| 4,940,033 | 7/1990 | Plee et al. | 123/435 |

FOREIGN PATENT DOCUMENTS

| 0079072A | 11/1972 | European Pat. Off. | |
| 0093485 | 4/1987 | Japan | 123/435 |
| 2194634A | 8/1987 | United Kingdom | |

Primary Examiner—Tony M. Argenbright
Assistant Examiner—Robert E. Mates
Attorney, Agent, or Firm—Davis, Bujold & Streck

[57] ABSTRACT

A method of controlling an internal combustion engine 1 is disclosed in which radiation during combustion is sensed by a probe (8) which sends a signal to an engine management unit (6) of the engine (1) to control the ignition timing or fuel injection to prevent knock occurring.

6 Claims, 2 Drawing Sheets

METHOD OF CONTROLLING AN INTERNAL COMBUSTION ENGINE

BACKGROUND TO THE INVENTION

The present invention relates to a method of controlling an internal combustion engine and more particularly to a method of controlling rapid combustion and/or knock (hereafter called 'knock') in such an engine.

The difference between normal and knocking combustion in an internal combustion engine may be described as the difference between the air/fuel mixture burning and it exploding. The consequences of severe or prolonged knocking in an engine are potential piston, valve or combustion chamber damage, and a reduced engine life.

DESCRIPTION OF THE PRIOR ART

To counter the problems caused by knocking, it is known to employ an accelerometer mounted on the engine to identify knocking by detecting a significant change in engine vibrations and to retard the ignition crankangle until the abnormal vibrations cease, before gradually re-advancing the ignition to its original setting. However, available accelerometers are not as sensitive as may be desired and a percentage of potential engine performance must be relinquished. In addition to accelerometer sensors, it is known to use pressure transducers which are inserted into the combustion chamber through tappings cut into bosses which have been specially cast through the cylinder head water jacket. Such a location ensures cooling of the transducer, but a pressure transducer requires additional work on the cylinder head which is not economical. Further, a proportion of engine components, particularly cylinder heads, are scrapped because they do not fall within the dimensional tolerances necessary to maintain the engine compression ratios within specified limits. The compression ratio has a direct effect on the ignition crankangle at which knock occurs It is therefore desirable to provide an improved method of controlling knock in an internal combustion engine because engine performance can be improved and manufacturing costs can be reduced by permitting wider tolerances on certain engine components.

It is therefore an object of the present invention to provide a method of controlling an internal combustion engine which overcomes or alleviates the above mentioned disadvantages.

SUMMARY OF THE INVENTION

The invention provides a method of controlling knock in an internal combustion engine by sensing radiation emission during combustion, converting the sensed emission into a control signal, supplying the control signal to an engine control means for detecting knock, wherein the engine control means operates on detecting knock to vary the ignition timing or fuel injection system of the engine thereby to reduce the knock.

The engine control means may be adapted to detect knock on the basis of the peak emission level sensed during combustion. Alternatively, the engine control means may be adapted to detect knock on the basis of the total radiation emission sensed during combustion. As a further alternative, the engine control means may be adapted to detect knock on the basis of the rate of change of radiation emission during combustion.

Preferably, the engine control means operates on detecting knock to retard the ignition timing to a point where knock is no longer detected and subsequently advancing the ignition timing towards its original setting.

The sensed radiation emission may be converted to a control signal by means of a photo-transistor or a photo-diode.

Radiation emission is preferably sensed by means extending to an engine combustion chamber. The sensing means may be incorporated in an engine spark plug or in an alternative location within the combustion chamber. Sensed radiation emission may be transmitted to the converter by way of a fibre optic cable.

BRIEF DESCRIPTION OF THE DRAWINGS

For a better understanding of the present invention and to show more clearly how it may be carried into effect reference will now be made, by way of example, to the accompanying drawings in which:

FIG. 1 shows an internal combustion engine 1 including a combustion chamber 2 containing a piston 3.

Figure 1:
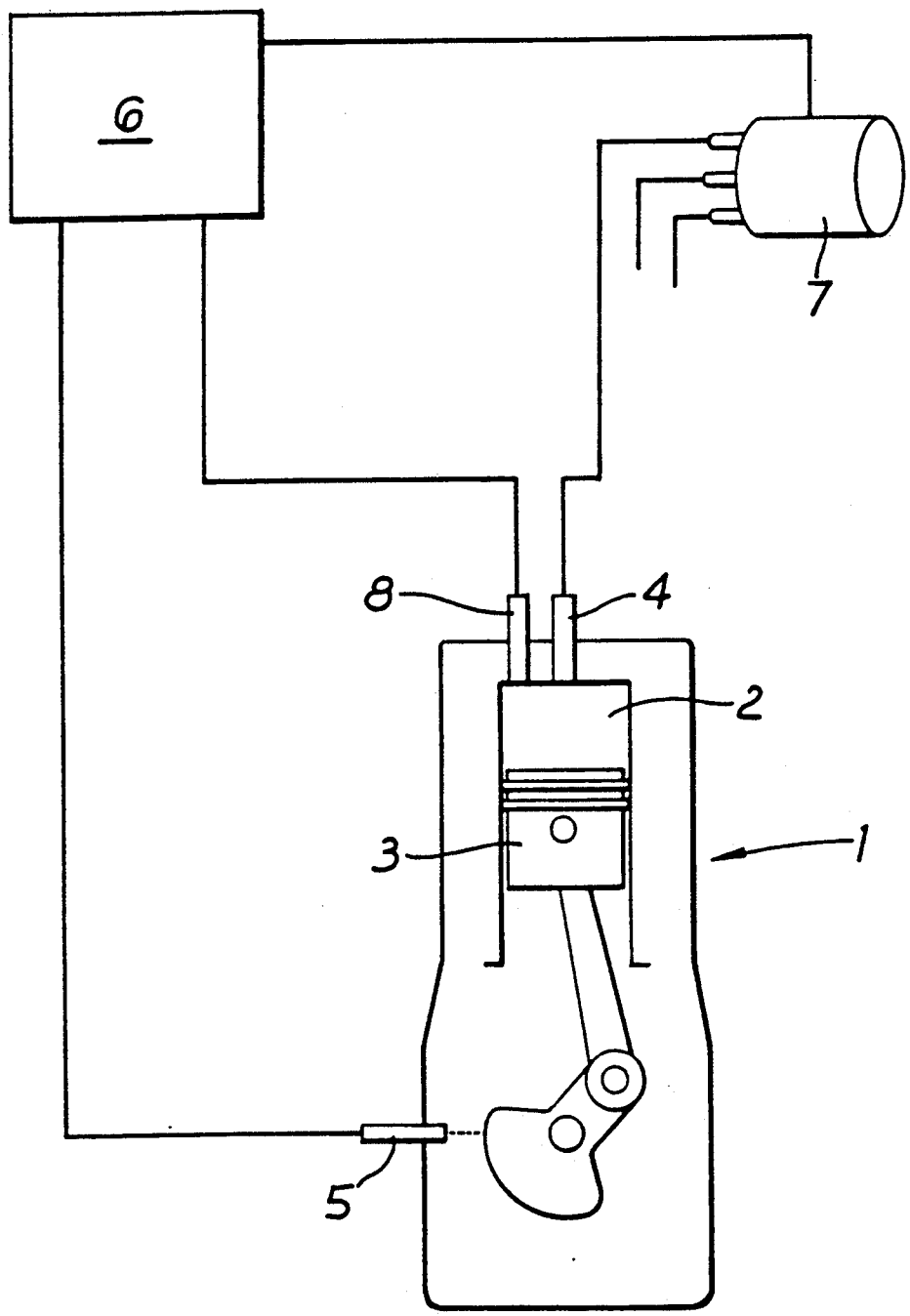
FIG. 1 is a schematic diagram illustrating one arrangement embodying a method of controlling an internal combustion engine according to the present invention.

The electrodes of a spark plug 4 extend into the combustion chamber 2 and are supplied with electrical energy from an engine management unit 6 by way of a distributor 7. A probe 8 for detecting photo-emissions from combustion within the combustion chamber supplies a signal representative of the intensity of photo-emissions within the chamber to the engine management unit 6 to enable the engine management unit to control the ignition timing or crankangle in dependence inter alia on information derived from the photo-emission signal and from a crankangle sensor 5. In the case of a fuel injected engine, the engine management unit would control the fuel injection in addition to or as an alternative to the ignition crankangle.

Figure 2:
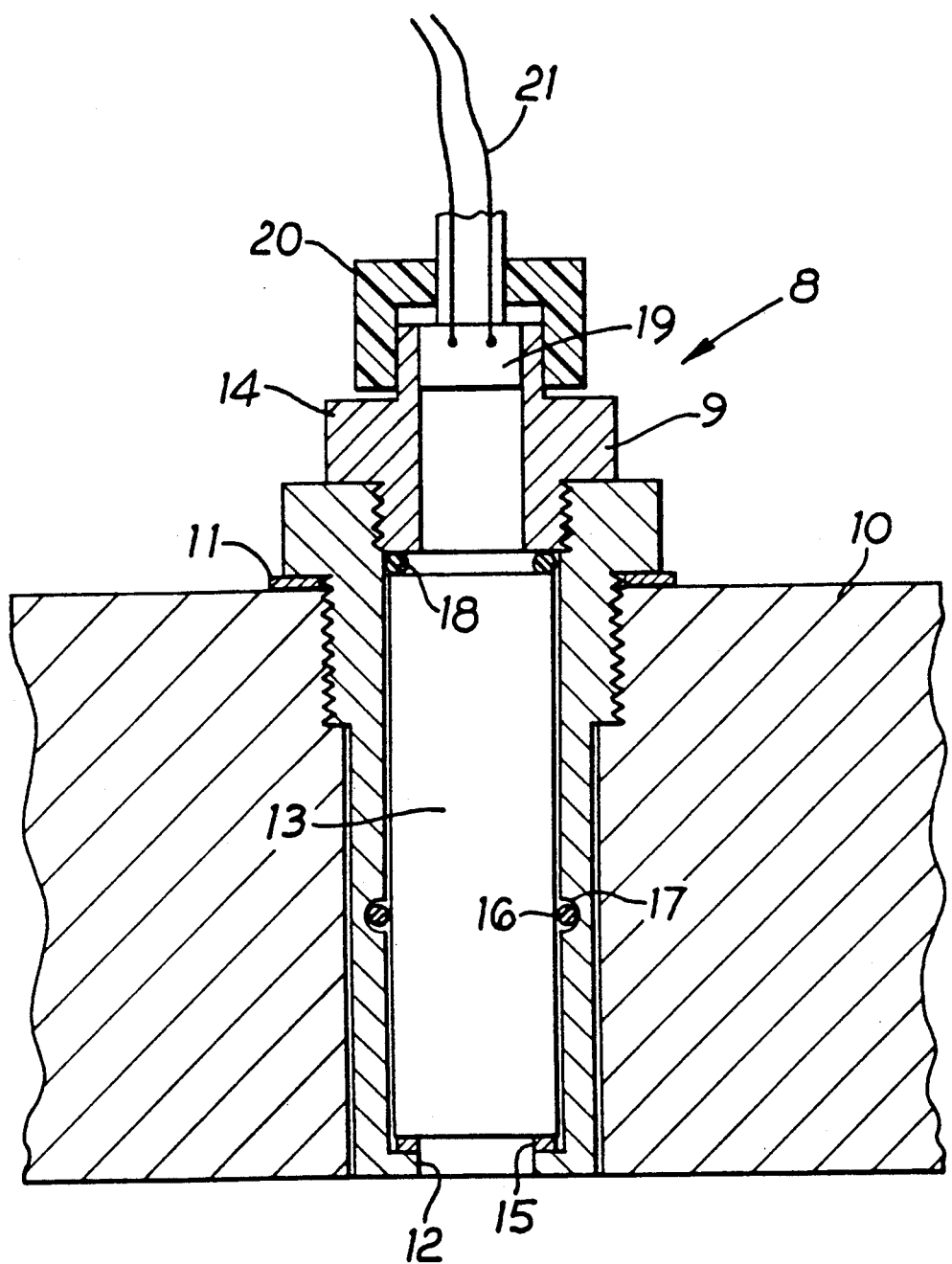
FIG. 2 illustrates a probe for detecting photo-emissions from combustion within the engine.

FIG. 2 is a schematic cross-sectional view showing the probe 8 in more detail. As can be seen from FIG. 2, the probe comprises a probe body 9, for example of steel, which is inserted through a cylinder head 10 by way of a screw threaded bore. A washer 11, for example of copper, is arranged between a part of the probe body and the cylinder head and inhibits any loss of combustion gases from the cylinder. The probe body is hollow and is formed with a lip 12 at that end thereof adjacent to the combustion chamber. Arranged within the probe body 9 is a window 13 for sensing radiation emission, which window transmits at least a part of the photo-emmissions from the combustion. The window 13 may be made, for example, of quartz. At the free end of the probe body, the window 13 is retained by means of a hollow nut 14 which is screwed onto a internal thread provided on the probe body. The escape of combustion gases around the window 13 is inhibited by means of a washer 15, for example of copper, located between an end of the window and the lip 12, an 'O'-ring 16 arranged in a groove 17 formed intermediate the ends of the probe body, and an 'O'-ring 18 between an end of the window 13 and the hollow nut 14.

A converter in the form of a photo-emission detector 19 is secured within the hollow nut 14 and is protected by a cap 20 for example of plastics material. The output of the detector 19 is connected to the engine management unit by means of a cable 21, which also serves to screen the signal from electro-magnetic interference. The photo-emission detector 19 may be, for example, a photo-electric, pyro-electric or other device to convert the photo-emissions into voltage signals. Suitable devices include silicon photo-transistors and germanium photo-diodes. Photo-emissions impinging on the detector 19 generate a voltage in proportion to the photo-emission intensity. The voltage signal is transmitted by the cable 21 to the engine management unit.

In use, photo-emissions are generated only during each combustion cycle within the engine. The photo-emission intensity varies with crankangle and load. There is also a degree of randomness between consecutive combustion cycles. When knock occurs there is a marked change in photo-emission intensity and we have found that the onset of knock can successfully be detected by detecting such an increase in peak photo-emission intensity in the form of an increased maximum voltage output of the detector.

As an alternative to measuring the peak intensity of photo-emissions, the emission profile can be stored in the engine management unit. The stored values can be used to provide an accumulated total emission represented by the sum of a number of discrete voltage measurements, or can be used to detect the maximum rate of change of photo-emissions during each combustion cycle. We have found that the onset of knock can be detected by noting any significant increase in the total emission or in the maximum rate of change of emission.

If knock is detected by the engine management unit, the unit responds by retarding the ignition crankangle until knocking is no longer detected and gradually re-advancing the ignition crankangle to its original setting.

As an alternative to providing a separate probe, the photo-emissions may be sensed by incorporating a photo-emission detector in a spark plug or in an alternative location within the combustion chamber. However, it may be convenient to remove the photo-emission detector from the probe or the spark plug and position the detector in a less hostile environment. This can be accomplished, for example, by transmitting the photo-emissions to a remotely positioned detector by means of a fibre optic cable.

The window is shown in the drawings as having a planar tip which is recessed into the probe. It may be advantageous to arrange the tip of the window to be flush with the tip of the probe. It may also be advantageous to form the tip of the window with a curvature so that it can act as a lens and gather photo-emissions from a larger proportion of the combustion chamber than would otherwise be possible.

Instead of storing the emission profile and using the profile to determine the maximum rate of change of photo-emissions, this can be accomplished directly by employing a differentiator which outputs a signal proprotional to the rate of change of its input signal.

We have found that the method of the present invention allows the ignition timing to be set closer to the point at which knocking is detected. The advance of the ignition timing by about 2° or 3° results in an improvement in the efficiency of the engine performance. We have also found that it is possible to relax the under-size tolerances of the combustion chamber dimensions so that a proportion of cylinder heads which previously have had to be scrapped can now be used with a consequent saving in manufacturing costs.

I claim:

1. A method of controlling knock in an internal combustion engine comprising the steps of:
    sensing rate of change of radiation emission during combustion; converting the sensed emission into a control signal; supplying the control signal to an engine control means for detecting known, operating the engine control means to vary at least one of the ignition timing and fuel injection system of the engine thereby to reduce the knock.

2. A method as claimed in claim 1, including operating the engine control means on detecting known to retard the ignition timing to a point where knock is no longer detected and subsequently to advance the ignition timing towards its original setting.

3. A method as claimed in claim 1, including converting the sensed radiation emission to a control signal by means of a photo-transistor or a photodiode.

4. A method as claimed in claim 1, including sensing radiation emission by means extending to an engine combustion chamber.

5. A method as claimed in claim 4, including incorporating the sensing means in an engine spark plug within the engine combustion chamber.

6. A method as claimed in claim 4, including transmitting sensed radiation emission to a converter by way of a fibre optic cable.

* * * * *

UNITED STATES PATENT AND TRADEMARK OFFICE
CERTIFICATE OF CORRECTION

PATENT NO. : 5,033,434

DATED : July 23, 1991

INVENTOR(S) : Russell Grant BRITTON

It is certified that error appears in the above-identified patent and that said Letters Patent is hereby corrected as shown below:

Column 4, line 27 change "known" to "knock".

Signed and Sealed this

Twenty-second Day of December, 1992

Attest:

DOUGLAS B. COMER

*Attesting Officer*   *Acting Commissioner of Patents and Trademarks*